May 1, 1951     C. R. BACCA     2,551,523

ELECTRICAL BRAKE OPERATING DEVICE

Filed July 6, 1948

Charles R. Bacca INVENTOR.

BY Albert F. Robinson
Attorney

Patented May 1, 1951

2,551,523

UNITED STATES PATENT OFFICE 2,551,523

ELECTRICAL BRAKE OPERATING DEVICE

Charles R. Bacca, Covington, Ky.

Application July 6, 1948, Serial No. 37,280

14 Claims. (Cl. 201—48)

This invention relates to an electrical operating mechanism or device which is adapted to be connected to the brakes of a trailer for being operated concomitantly with those on the motor vehicle to which the trailer is attached.

The device is adapted to be mounted at any convenient place on the motor vehicle, such as under the dash or hood, in position to be wired to the vehicle battery for a source of electric power and be operated by the brake pedal to make electrical contact between the power source and the brake line to the trailer. A series of contact points is provided so that the electrical energy is increased, with consequent decrease in electrical resistance, as pressure on the foot pedal is increased. Accordingly, the braking action on the trailer is not only actuated by the same operation which actuates the brakes on the motor vehicle but the degree of braking action is synchronized so that the momentum of the trailer can be stopped by its own brakes and operated by the same braking operation as for the motor vehicle.

Generally described, the invention, comprising a holder or bracket whereby the device can be mounted in place, includes an electrical contact device and means for operating said contact device. An electrical contact plate is mounted in position to be contacted by a series of points which are actuated in contact with the plate. The points are movably mounted on a member which is actuated by the vehicle foot pedal. This can advantageously be an hydraulic device connected to the fluid brake system. The points are arranged in series so that they contact the plate in sequence, and, as the number of contacts is increased, the electrical energy in the line is increased with corresponding reduction in electrical resistance. Accordingly, the degree of braking action upon the brakes of the trailer may be synchronized with those upon the brakes of the motor vehicle and both will be actuated simultaneously. This permits the brakes on the trailer being fully controlled, and, although the brakes on the trailer are separate from and independent of those on the motor vehicle, they are actuated by a common means and synchronized.

The device is actuated by the brake pedal of the motor vehicle and may be connected advantageously to the fluid brake system. The fluid in the system, upon operation of the foot pedal, will actuate the electrical contact points in contact with a plate which is wired to the battery. The contact points are connected together by resistance wires and are wired to the brakes of the trailer.

The contact points are preferably in the form of bars or rods, each of which is surrounded by a tension spring, preferably wire coils to hold them yieldably mounted upon the movable holder.

The resistance wire connections between the bars or rods are preferably coiled counter-clockwise so that, as the contact points are pressed in contact with the plates, the coils of the resistance wire will be held out of contact. Thus, the resistance will not be reduced as would result if the wires of the resistance coils contacted and shortened the resistance. The resistance coils are also preferably connected by a continuous wire.

For a better understanding of the invention, reference is made to the accompanying drawings, in which.

Figure 1:
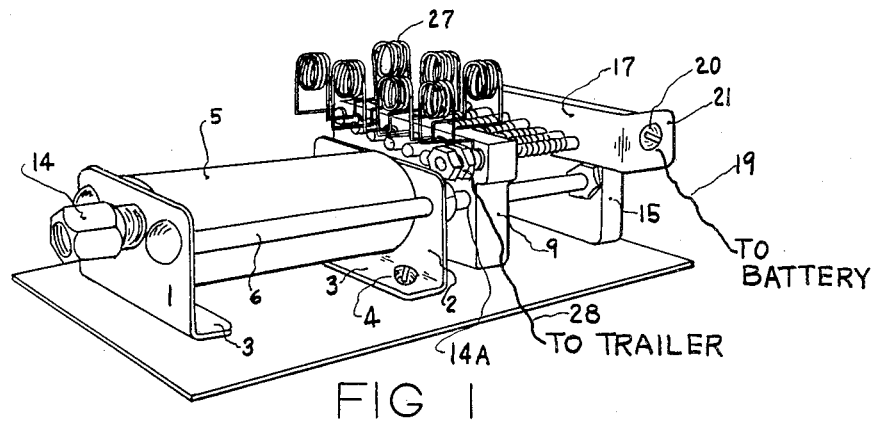
Fig. 1 is a perspective view of a device embodying the invention.
Figure 2:
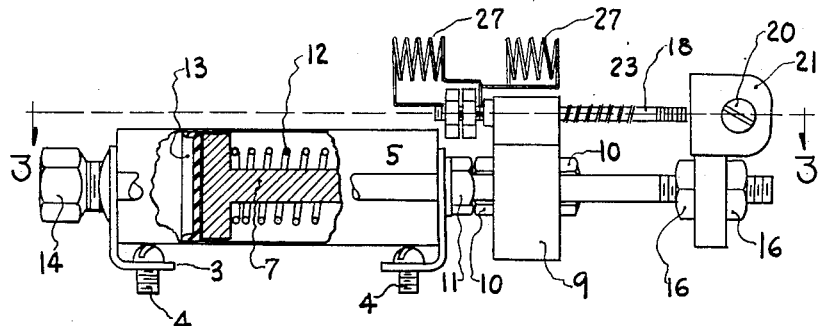
Fig. 2 is a side elevation, partly in section.
Figure 3:
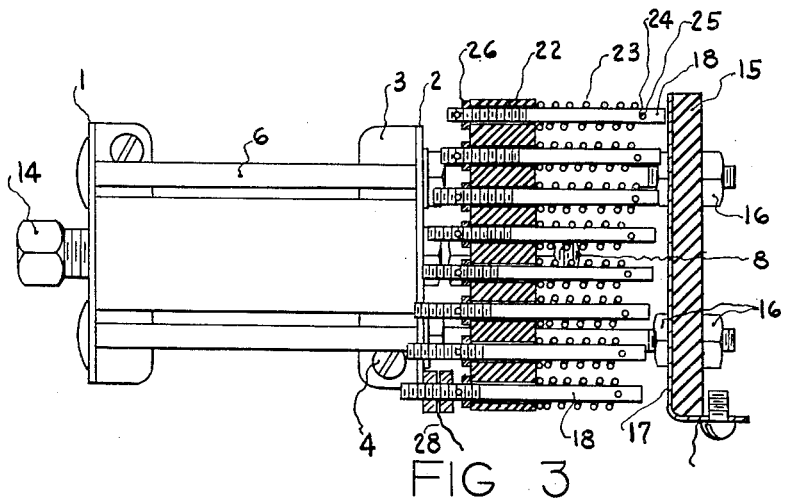
Fig. 3 is a top plan view of the device.

Referring specifically to the drawings in which like numerals refer to like parts, numerals 1 and 2 designate two brackets having feet 3 through which fastening means 4 are projected for mounting the device in position on some fixed part of a motor vehicle. A cylinder 5 is inserted between the brackets which are clamped against the ends of the cylinder by a pair of bolts 6.

The cylinder has a chamber therein in which is a piston 7 having one end 8 projecting through an end of the cylinder and the bracket plate for mounting a holder 9 thereon. The holder may be properly adjusted by nuts 10 which are screw-threaded on the projecting end 8 of the piston. A lock nut 11 is provided advantageously to abut against one of the nuts 10 for securing them in adjusted position on the extension. A compression spring 12 is inserted between the piston and one end of the cylinder to return the piston to normal position from which it is actuated by hydraulic pressure against the opposite side of the piston. The hydraulic chamber on this opposite side of the piston head is sealed by a cup-shaped sealing ring 13 to prevent any liquid escaping from the hydraulic chamber past the piston. The opposite end of the hydraulic chamber is provided with a fitting 14 for being connected to the fluid brake system of the motor vehicle.

The bolts 6 extend through perforations 14a in the holder 9 in position to have an insulation plate 15 clamped thereon between nuts 16. A metal contact plate 17 is attached to the face of the insulation plate in position to be contacted by contact members 18. The contact plate is wired to the car battery by wire 19 connected to the clamp 20 on the end 21 of the plate.

A series of contact members 18 are mounted on the holder 9. These are projected through recesses 22 in the holder in free sliding movement. A coiled compression spring 23 surrounds each of the members with one end seated against the holder and the opposite end attached to the contact member by an end 24 of the spring projecting through a recess 25 in the end of the member. The springs are under compression to hold the heads 26, on the opposite ends of the contact members, against the holder. Resistance coils 27 connect between each of the adjacent contact members. The resistance coils are preferably formed by one continuous wire so that there would be less chance of any loose connection with the contact members than if separate wires were used. However, this is not essential as the resistance wires between two adjacent contact members may be separate from those between the other adjacent members. However, the resistance wires are functionally continuous and preferably are structurally continuous.

The end contact member of the device is wired to the brakes of a trailer by connection 28. As above described, the device is connected to the hydraulic brake system of the motor vehicle by connection fitting 14. Thus, when the brake foot pedal of the motor vehicle is depressed, it will actuate the vehicle brakes and the piston of the contact device which is connected to the brakes on the trailer.

The piston moves the holder, on which the contact members are mounted, towards the contact plate. First, one of the contact members is impinged against the contact plate with electrical resistance passing through all of the resistance coils. As the holder is actuated further, the second contact member, then the third and so on, is brought in contact with the contact plate to exert the same degree of braking by the brake of the trailer as is exerted by the vehicle brakes. As more contact members contact the contact plate, the resistance through the resistance coils is correspondingly reduced and the electrical energy is correspondingly increased.

The illustrated embodiment, for example, shows a series of eight contact members with seven resistance coils between adjacent members. The first resistance coil, starting from right to left, may have 3.5 ohms resistance, the next 3, the next 2.5, etc. down in a graduated scale to the last which is .5, and with the energy of the brake on the trailer energized to its full braking effectiveness. Thus, it will be apparent that the brakes on the vehicle and on the trailer are synchronized and operated concomitantly from a common brake pedal in the motor vehicle, and any combination of synchronization desired can be obtained by proper adjustment of the contact points.

While I have illustrated and described one embodiment for carrying the invention into effect, it will be understood that there may be various changes in details of construction without departing from the spirit of the invention.

I claim:

1. An electrical contact device for synchronizing the brakes on a trailer with those on a motor vehicle to be operated by a common means comprising a contact plate adapted to be connected to the vehicle battery, a series of contact points adapted to be connected to the brakes of a trailer, hydraulically operated means having fixed thereon a holder on which said contact points are mounted, and means for being connected to the fluid brake system of the vehicle for actuating said hydraulically operated means for moving the contact points progressively in contact with the contact plate.

2. An electrical contact device comprising a plate adapted to be wired to a source of electrical power, a series of contact members mounted upon a movable member in position to progressively contact said plate, a connection from the contact members to a member which is to be energized, means for adjusting the plate in relation to the series of contact points, and hydraulically operated means having attached thereto holder means on which said series of contact members are mounted for moving them against the plate.

3. An electrical contact device comprising a plate adapted to be wired to a source of electrical power, a series of contact members mounted upon a movable member in position to progressively contact said plate, a connection from the contact members to a member which is to be energized, an electrical resistance between adjacent contact members, and hydraulically operated means carrying the movable member for actuating the movable member to contact the contact members with the plate.

4. An electrical contact device comprising a rheostat, said rheostat having a plate adapted to be wired to a source of electrical power, a series of contact members mounted on a support in position to progressively contact said plate by relative movement of said plate and contact members, and a resistance means for each of the contact members, a connection from the contact members of the rheostat to a member which is to be energized, and an hydraulically operated member having attached thereto means carrying the relatively movable part of the rheostat for causing said plate and contact members to make and break contact.

5. An electrical device as set forth in claim 4 having a lever device for controlling operation of the electrical contact device.

6. A circuit control device comprising a contact plate member adapted to be connected in an electrical circuit, a support member carrying a series of contact devices disposed adjacent the said plate member for progressively contacting therewith, hydraulically operated means to which one of said members is positively connected for moving it relatively to the other member for making and breaking contact between the members, and a fitting for connecting the hydraulic means with a fluid supply system.

7. A circuit control device as set forth in claim 6 in which the series of contact devices are yieldably held on the support member adjacent said contact plate.

8. A circuit control device comprising a cylinder mounted between spaced apart bracket supports by one or more rods extending beyond one of the supports, an inlet conduit in one end of the cylinder for connecting said cylinder to an hydraulic system, one part of a switch mechanism supported by the rod or rods, a holder carrying the other part of the switch mechanism and being slidably mounted upon said rod or rods for moving the part of the switch mechanism carried thereby in and out of contact with said one part of the switch mechanism carried by the rod or rods, a movable member within the cylinder connected to the holder adapted to be hydraulically operated for moving the holder toward the switch part on the rod or rods, and spring means actuating the holder away from the other switch part for normally holding the switch parts out of contact.

9. A circuit control device comprising a cylinder mounted between spaced apart bracket supports by one or more rods extending beyond one of the supports, an inlet conduit in one end of the cylinder for connecting said cylinder to an hydraulic system, one part of a switch mechanism supported by the rod or rods, a holder carrying the other part of the switch mechanism and being slidably mounted upon said rod or rods for moving the part of the switch mechanism carried thereby in and out of contact with said one part of the switch mechanism carried by the rod or rods, means for adjusting at least one of the parts of the switch mechanism on the carrying member, a piston within the cylinder connected to the holder and adapted to be hydraulically operated for moving the holder toward the switch part on the rod or rods, and a spring means actuating the holder for normally holding the switch parts out of contact.

10. A circuit control device comprising a cylinder mounted between spaced apart bracket supports, a pair of rods projecting through the brackets and extending therebeyond, an inlet conduit in one end of the cylinder for connecting the cylinder to an hydraulic system, one part of a switch mechanism mounted on the extended ends of the rods, a holder carrying the other part of the switch mechanism and being slidably mounted upon said rods for moving the part of the switch carried thereby in and out of contact with said one part of the switch mechanism carried by the rods, a piston within the cylinder adapted to be hydraulically operated for moving the holder toward the switch part which is mounted on the rods, and spring means actuating the holder for normally holding the switch parts out of contact.

11. An electrical contact device comprising a cylinder, mounted upon a support, having a chamber with an inlet nozzle for being connected to an hydraulic system, an hydraulically operated member movably mounted within the chamber of the cylinder, a plurality of rods fixed to the device and extending beyond the end of the cylinder opposite to its inlet end, a rod movable by the hydraulically operated member parallel to said plurality of rods to be moved by said hydraulically operated member, a switch mechanism having one part mounted on the fixed rods and the other part mounted on the movable rod, and a spring for normally holding the switch parts out of constant.

12. An electrical contact device comprising spaced apart brackets having means for being attached to a support, a cylinder interposed between the brackets, means for clamping the cylinder between the brackets, an electrical contact means mounted on the bracket clamping means, a pressure actuated member mounted within the cylinder, a rod actuated by the pressure actuated member having an electrical contact means secured thereto to be moved relatively to the contact means on the bracket clamping means, means for adjusting one of the contact means in respect to the other contact means, and yieldable means for normally holding the pressure actuated contact means out of contact with the other contact means.

13. An electrical contact device comprising a support, a slidable member mounted on the support, electrical means provided with a series of contacts carried by said slidable member, electrical means provided with a series of contacts disposed to be contacted by electrical contact means carried by the slidable member, resistance means between the contacts of one of the electrical means, means for adjusting the contacts on one of the electrical means for them to be progressively contacted by the contacts of the other electrical means, yieldable means actuating the slidable member for normally holding the electrical contacts separated, and means whereby the slidable member is actuated against the tension of the yieldable means for progressively contacting the series of contacts of the two electrical means.

14. A circuit control device comprising a contact plate member adapted to be connected in an electrical circuit, a support member carrying a series of contact devices disposed adjacent said plate for progressively contacting therewith, hydraulically operated means to which one of said members is connected for moving it relatively to the other member for making and breaking contact between said members, means for resiliently holding the members normally out of contact and resisting movement of the hydraulically operated means for contacting said members, and a fitting for connecting the hydraulic means with a fluid supply system.

CHARLES R. BACCA.

REFERENCES CITED

The following references are of record in the file of this patent:

UNITED STATES PATENTS

| Number | Name | Date |
| --- | --- | --- |
| 733,562 | Sundh | July 14, 1903 |
| 1,143,487 | Belin | June 15, 1915 |
| 1,952,679 | Leveen | Mar. 27, 1934 |
| 2,134,323 | Beach | Oct. 25, 1938 |
| 2,182,450 | Clarkson | Dec. 5, 1939 |
| 2,260,641 | Reid | Oct. 28, 1941 |
| 2,355,975 | Henrici | Aug. 15, 1944 |
| 2,407,509 | Oetzel | Sept. 10, 1946 |
| 2,434,182 | Taplin | Jan. 6, 1948 |
| 2,452,033 | Born | Oct. 26, 1948 |